Oct. 13, 1953  R. HUDSON  2,655,016
SUMP-DRAINED DISH STRUCTURE
Filed Dec. 14, 1950  3 Sheets-Sheet 1
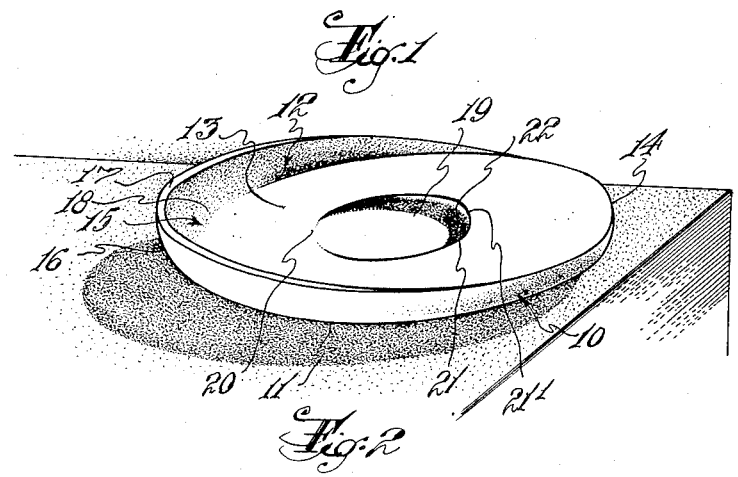
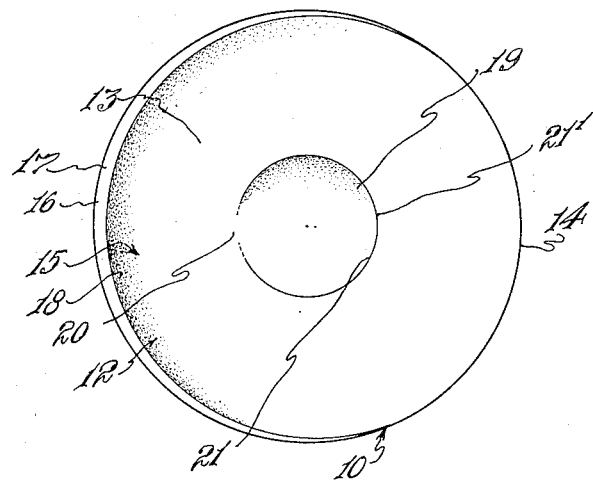
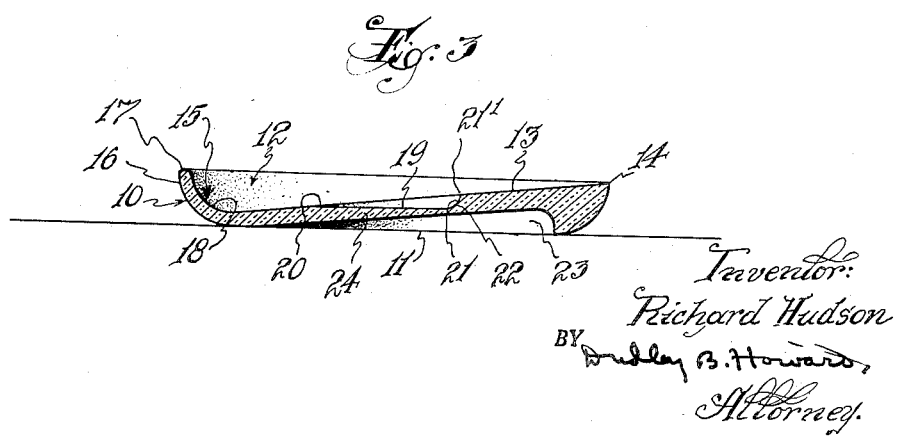
Inventor:
Richard Hudson
BY Dudley B. Howard,
Attorney.

Oct. 13, 1953 R. HUDSON 2,655,016
SUMP-DRAINED DISH STRUCTURE
Filed Dec. 14, 1950 3 Sheets-Sheet 2
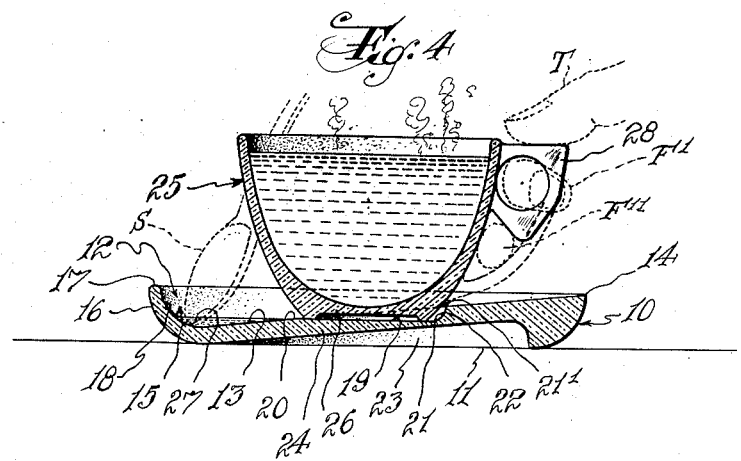
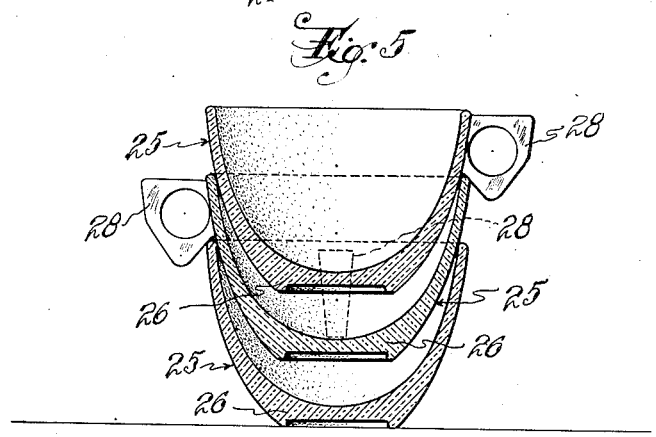
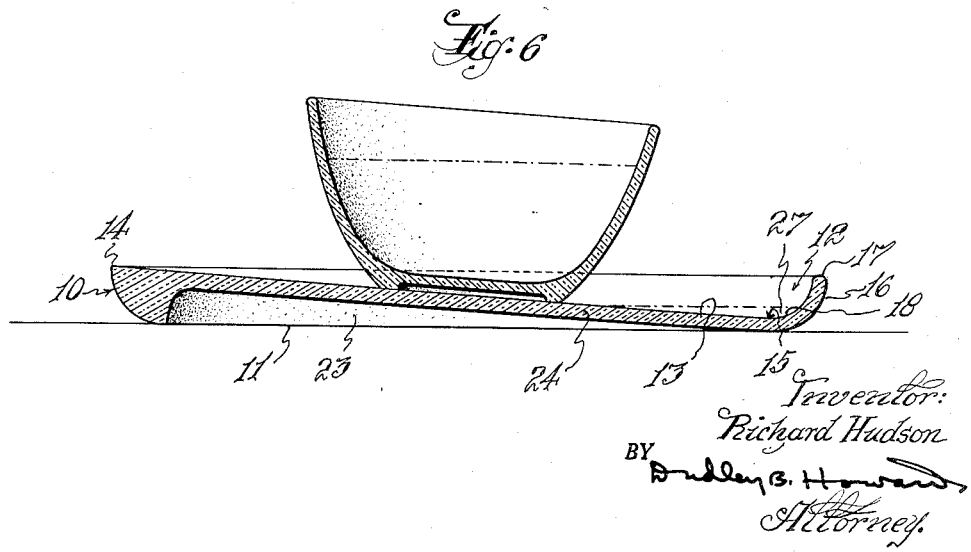
Inventor:
Richard Hudson
BY
Dudley B. Howard
Attorney.

Oct. 13, 1953     R. HUDSON     2,655,016
SUMP-DRAINED DISH STRUCTURE
Filed Dec. 14, 1950     3 Sheets-Sheet 3
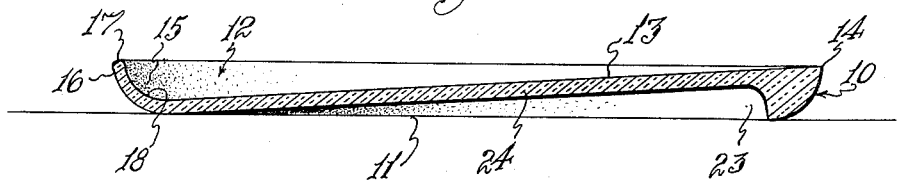
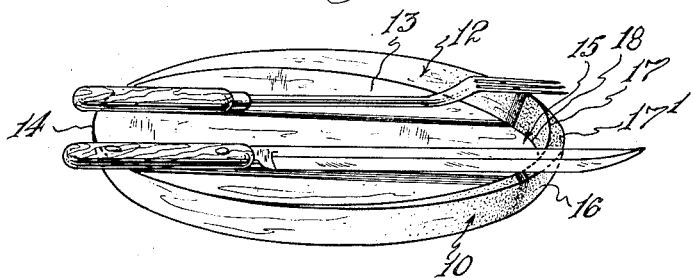
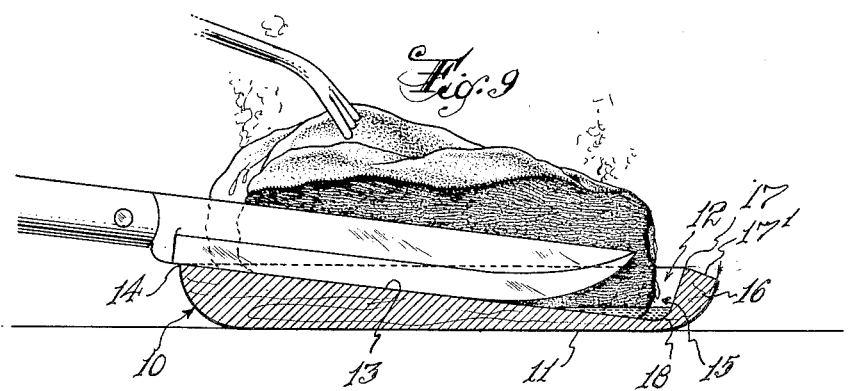
Inventor:
Richard Hudson
BY
Attorney.

Patented Oct. 13, 1953

2,655,016

UNITED STATES PATENT OFFICE 2,655,016

SUMP-DRAINED DISH STRUCTURE

Richard Hudson, Madison, N. J.

Application December 14, 1950, Serial No. 200,723

3 Claims. (Cl. 65—15)

The invention relates to tableware in general and has particular reference to shallow foundation dishes that rest in direct table contact for the support of other superimposed dishes or to contain the main food course.

In further definition of the term "shallow foundation dishes," it may be explained that the first category just mentioned, i. e. dish-supporting dishes, embraces saucers and small bread-and-butter plates for the spillage-catching support of tea cups, coffee cups, cocktail glasses and soup bowls, whereas breakfast plates, dinner plates and meat platters are included in the second category.

Prior to my invention, nearly all shallow foundation dishes have had level upper supporting surfaces upon which liquids spilled from supported cups, glasses or bowls will spread in an extensive though shallow pool in which the bases of the supported dishes will be immersed. Consequently, when the supported dishes are lifted therefrom during the normal manipulation of drinking, the adhering film of spilled liquid will drip from corners of the dish bases onto tablecloth and clothing. In the case of breakfast or dinner plates, fluent foods such as meat juices, gravy and sauces which may have been served on one of these plates will be free to spread over the level surface to become mixed with each other and with solid foods in a distasteful and otherwise objectionable manner. Furthermore, intentional segregation of certain solid food articles and mixing of others with fluent articles, as the mixing of mashed potato with gravy, is rendered difficult of accomplishment.

Meat platters of usual design pose a similar problem, but I am aware that in the past dishes in this specific class have been provided with sloping upper surfaces or grooves which are intended to drain meat juices liberated by carving into a recessed trough or well for collection and subsequent removal by spooning or pouring. However, the specific construction of the functionally related draining surface and collection trough or well of these self-draining platters has been such that spooning in particular is made very awkward and inefficient.

It, therefore, is the primary object of the present invention to provide a novel liquid drainage and collection structure for the various types of shallow foundation dishes which will eliminate the undesirable characteristics just mentioned.

A further object is to provide an improved self-draining dish structure which is especially suited to production from plastic material by molding processes and which combines simplicity and beauty of design with practical utility.

Other objects and advantages of the invention, not at this time more particularly enumerated, will be understood from the following description of the same.

Illustrative embodiments of the invention are shown in the accompanying drawings, in which:

Fig. 1 is a perspective view of a saucer constructed in accordance with the invention; Fig. 2 is a top plan view of the same; Fig. 3 is a vertical cross-sectional view; and Fig. 4 is a view similar to Fig. 3, showing a cup of cooperative form resting upon the saucer and illustrating operational details of practical use.

Fig. 5 is a vertical cross-sectional view of a plurality of nested cups of the cooperative design.

Fig. 6 is a vertical cross-sectional view of a bread-and-butter plate constructed in accordance with the invention and a soup bowl resting thereupon.

Fig. 7 is a vertical cross-sectional view of a dinner plate embodying the invention.

Fig. 8 is a small-scale perspective view of a steak platter embodiment, showing carving implements resting thereon in readiness for use; and Fig. 9 is a fragmentary vertical section showing the platter and carving implements in actual use.

Similar characters of reference are employed in the above described views to indicate corresponding parts.

Broadly stated, the fundamental structural embodiment of the present invention in its application to curved-rim flat foundation dishes of various functional types is the cooperational relation between the extensive, sloping, countersunk drainage surface and the maximum radius, curving sump which borders the peripheral rim of each dish at the deep side of the countersink. It is this cooperational relation which facilitates smooth, sweeping movement of a spoon through the sump in an ascending direction during the latter part of each stroke, whereby gravitational resistance to forward movement of liquid in the sump under impulsion of the spoon will cause neat spoonfuls to be picked up without danger of objectionable surge which might overflow the rim of the dish.

Figs. 1 to 4 of the drawings show the above-mentioned fundamental structure embodied in a saucer for use with a coffee cup or teacup. It is to be understood, however, that the saucer illustrated is equally adapted for use with fruit cocktail glasses. In this embodiment, the dish body 10 preferably is circular in shape and has a horizontal base 11 for table contact. The upper surface of body 10 is marginally level but an extensive area thereof is countersunk asymmetrically as at 12 to provide a plane-surfaced sloping bottom 13 for the countersink as viewed in vertical cross-section along the diameter (Figs. 3 and 4). Bottom 13 of countersink 12 forms a sloping drainage surface which is peripherally convex and preferably circular like the preferred peripheral outline of body 10, but is slightly smaller in diameter than said body periphery. Drainage surface 13 also is arranged with the upslope part of its periphery substantially internally tangential to the periphery of body 10 as shown particularly in Fig. 2. At the region of tangency, which is the most elevated part of drainage surface 13, said surface merges with rim 17 of countersink 12 to form a pouring edge 14 that extends through an arc of approximately 120 degrees. Elsewhere than along pouring edge 14, the side face 18 of countersink 12 curves in vertical cross-sectional profile concavely downward and inward from rim 17 into smooth tangential mergence with drainage surface 13. At the lowest part of drainage surface 13, a liquid collecting sump 15 is formed and said surface serves to drain liquid into the sump. At their area of mergence in sump 15 and circumferentially away from the latter in both directions where the drainage surface rises toward pouring edge 14, said drainage surface and side face 18 of countersink 12 combine to form a spoon guide which conforms in vertical section to the bowl tip of a spoon, which in this saucer embodiment of the invention will be a teaspoon. In horizontal plan, the spoon guide follows a large-radius, smoothly sweeping curve greatly favoring the removal from sump 15 of its liquid contents by spooning in a manner described later herein. It will be observed that there is no objectionable depression of the sump below the plane of drainage surface 13, which is an important feature of the present invention.

The outer peripheral face 16 of body 10 curves downward and inward from rim 17 in a graceful curve which not only enhances the beauty of the design but also sharpens pouring edge 14 to facilitate liquid removal by pouring whenever that method is preferred to spooning.

In the center of sloping bottom, or drainage, surface 13, a level cup seat 19 is provided. Besides forming a support for a cup or glass, seat 19 is so related in construction to drainage surface 13 that lateral flow of spilled liquids into sump 15 will be permitted. For this latter purpose, the precise construction and arrangement of platform 19 is important. Said cup seat preferably is circular in horizontal contour and of a diametrical size somewhat larger than the base of a cup or glass to be supported thereby. At its side opposite to pouring edge 14 of the saucer, seat 19 merges with said drainage surface 13 in a flush spillway edge 20 of obtuse form. Consequently, the remainder of seat 19 is countersunk in said drainage surface 13, whereby a marginal face 21 rises from said surface 13 in surrounding relation thereto. Due to the relatively large diametrical size of seat 19, it is practicable to provide the base of face 21 with a smoothly curved, vertically concave portion 22, which is intended to facilitate smooth flow of spilled liquids in a moving current around the base of a supported cup or glass and thence over spillway edge 20 onto drainage surface 13.

As shown in Fig. 3, the under face of body 10 is recessed as at 23, by molding if made of earthenware, plastic material or metal, or by routing if made of wood, to reduce the weight. By shaping recess 23 so that the bottom wall 24 intervening between countersink, 12 and recess 23 is of uniform thickness, an incidental purpose will be served, i. e. use of the saucer in inverted position to support a bowl or other dish in inclined relation to the horizontal when desired. A further functional advantage of recess 23 is the production of base 11 in annular form, which tends to prevent accidental slipping of body 10 on the table top.

Fig. 4 illustrates the practical use of the improved saucer in cooperation with a supported cup 25. Since it is standard practice to manufacture cups and saucers in matched sets, cup 25 has been designed to fit the improved saucer in more ways than one. In the first place, the base 26 of cup 25 should be sufficiently smaller in diameter than cup seat 19 to insure adequate liquid flowage clearance between said cup base and smoothly curved, vertically concave base portion 22 of face 21.

When coffee or other liquid overflows the brim of cup 25, due to unsteady handling of the cup or to accidental shaking of the table, the spilled liquid will either fall directly onto drainage surface 13 or will run down the outside surface of the cup onto seat 19. Of the total quantity of liquid which may fall onto drainage surface 13, a portion thereof may flow around and past the rim 21' of the cup base countersink directly into sump 15 where it will collect as indicated at 27. Any portion of the liquid that flows over the rim 21' will descend into forceful contact with concave base deflected portion 22 of face 21. If said face 21 were vertically straight throughout its height and thus formed a right angle at its base juncture with platform 19, the falling liquid would be abruptly checked and would spread over the said platform slowly. Eventually, a portion would run over spillway edge 20, but a substantial quantity would remain on the platform for objectionable contact with the cup base due to inertia and adhesion. By providing vertically concave face portion 22, however, smooth, uninterrupted flow of the descending liquid is facilitated and thereby rapid and more nearly complete evacuation of the latter from cup seat 19 occurs. Any residual film of liquid will be so thin that drops will not be formed on the cup base when lifted in the act of drinking.

The use of a teaspoon S in removal of spillage from sump 15 also is illustrated in Fig. 4 in broken lines. It will be observed that the spoon-guide formed at the juncture of drainage surface 13 with side face 18 of countersink 12 permits the bowl tip of spoon S to scoop through practically the entire vertical cross-sectional area of the collected liquid 27. Referring momentarily to Fig. 1, it will be apparent that the forward motion of the spoon will follow a smooth, large-radius curve for such a distance that the spoon will be filled quickly. As the level of the sump contents is lowered after one or two spooning operations, the effectiveness of the long-stroke sweeping motion of the spoon will be more fully realized, because the spoon will move from the deep part of sump 15 upward along sloping drainage surface 13. In doing so, natural inertia of the liquid and the resistance of rising surface 13 will cause the residue to be picked up by the spoon. Even though the spooning strokes become longer and faster in the final effort to remove the last few drops of liquid, the resistance of the rising portion of the spoon guide surface will effectively counteract any tendency of the liquid at the spoon tip to spurt over the rim 17 of countersink 12.

It should now be apparent that all structural details of the dish body, such as drainage surface 13, spoon-guide surface 13—18, vertically concave face portion 22, cup seat 19 and spillway edge 20, cooperate in the accomplishment of novel and peculiarly efficient drainage functions and in the facilitation of rapid, neat removal of spillage by inconspicuous spooning.

If quicker though more conspicuous evacuation of spilled liquid from the saucer embodiment is desired, the cup may be lifted and the saucer tipped to pour the liquid from sump 15 back into the cup. When this is done, pouring edge 14 of the saucer body facilitates free pouring because of its sharpness.

Fig. 4 also illustrates the second respect in which the cup for the saucer embodiment of the invention is made to fit said saucer. To this end, the handle 23 of cup 25 is shaped in cooperative relation to body 10 so as to accommodate the customary use of one's fingers in handling the cup. Many persons habitually grasp the handle of a cup in the manner illustrated, wherein forefinger F' is inserted through the fingerhole in the handle, the second finger F'' is extended directly underneath the handle, and the thumb T is caused to bear against the top of the handle. The shape of the cup handle is immaterial when a saucer of standard design is used, because there will be adequate clearance beneath the handle for introduction of the holder's second finger. In the use of the improved saucer, however, the elevated portion of drainage surface 13 between cup seat 19 and pouring edge 14 would be so closely spaced from a cup handle of the standard downwardly tapering form, shown by the broken line, that there would be no finger room beneath the handle. In order to afford ample finger room in this position, a finger notch has been provided underneath handle 23.

It has been discovered that the provision of the handle notch has improved the cup structure in an unexpected way. Whereas, heretofore it has been impracticable to nest a plurality of cups having standard-form handles satisfactorily in a straight vertical stack, perfect vertical nesting is attainable with the improved cups as shown in Fig. 5. It was found that the rim of the cup bowl at any point removed from the handle will fit within the handle notch of a superimposed cup and will in turn permit the cup bowls to fit each other in a true axial manner.

Fig. 6 illustrates a bread-and-butter plate embodying the inventive concept in use with a soup bowl. Body 10 of the plate differs from the saucer body shown in Figs. 1 to 4 in the elimination of the cup seat. In practical use, the plate should be set on the table with the sump side away from the user so that the bowl will appear as if tilted invitingly forward. Drainage and the opportunity for neat, inconspicuous removal of any spilled soup from the sump of the plate by use of a spoon are the same as in the case of the saucer.

Fig. 7 shows the dinner plate embodiment, which differs in structure from the bread-and-butter plate merely in size. In the use of the improved dinner plate, it is practicable to place food items which it is desired to segregate from fluent foods on the high side adjacent to pouring edge 14, whereas soft foods which it is desired to mix with fluent material, such as mashed potato to be mixed with gravy, may be placed in or near sump 15. Spoon-guide surface 13—18 aids in smooth, neat fork removal of the mixed soft food from the sump.

Figs. 8 and 9 show a steak platter constructed in accordance with the invention. The platter body 10 is shown as differing from the dinner plate embodiment principally in the thickness and shape of the rim 17 of countersink 12. This is due primarily to the practical requirement that the body be made of wood, which will not dull the cutting edge of a carving knife blade K. Since the body 10 is made of wood, it is desirable to have a strong, thick back wall to withstand the impact of the knife blade in action. At the same time, it has been found that beveling the rim 17 as at 17' provides a sharp-edged blade rest for knife blade K when not in use and while reclining in this condition on the platter as shown in Fig. 8. The shape of the blade rest and the width of beveled surface 17' insure that any meat juices adhering to the knife blade when laid down will either drain back into sump 15 or become diffused over the wide surface 17' and thinned out so much that it will be unlikely that any will run off onto the tablecloth.

It will be observed that the perfectly plane-surfaced conformation of drainage surface 13 and the absence of any rim elevated above the plane of said surface along pouring edge 14 permit uniform bearing contact of the cutting edge of knife blade K clear across said drainage surface, as shown in Fig. 9. This feature is favorable to complete severance of a slice of meat at each stroke.

Obviously, in the use of the meat platter embodiment, collection and subsequent serving of liberated meat juices will be in open conformity to the rules of table etiquette and thus unlike the clumsy spilling of coffee or tea which must be taken care of afterward in a more or less surreptitious manner. Bold, rapid spooning of juices from the platter is proper and quite practicable with the improved sump and spoon-guide structure.

Having thus described the invention, I claim:

1. A foundation dish comprising a shallow body of peripherally convex form having a marginally convexly curved major portion of its upper surface countersunk asymmetrically to provide a plane-surfaced and uncovered sloping bottom for the countersink as viewed in vertical cross section along one diameter and a level completely vertical rim surrounding said countersink, said sloping bottom forming a drainage surface and having its periphery arranged substantially internally tangential to the body periphery at the most elevated point of said surface, said sloping drainage surface also being flush with the rim of the countersink at the region of peripheral tangency with the body periphery, the side face of the countersink elsewhere than at said region of tangency being smoothly curved downward and inward as viewed in vertical cross section into tangential mergence with the sloping drainage surface to provide a sump at the lower area thereof and a spoon guide extending in horizontal plan along the periphery of said surface in both directions from the deepest part of the sump in a smooth large radius curve.

2. A flat foundation dish as defined in claim 1, wherein a level cup seat of smaller diameter than the drainage surface is countersunk in said surface to such a depth that the marginal edge of the cup seat adjacent to the drainage sump is substantially flush with said drainage surface to form a spillway edge.

3. A flat foundation dish as defined in claim 2, wherein the cup seat is surrounded at its up-slope side by a vertical face of the countersink which merges with the cup seat in smoothly curved, vertically concave face portion adapted to facilitate uninterrupted flow of liquid spillage descending thereupon toward the spillway edge of said seat.

RICHARD HUDSON.

References Cited in the file of this patent

UNITED STATES PATENTS

| Number | Name | Date |
|---|---|---|
| 126,253 | Bernard | Apr. 30, 1872 |
| 421,264 | Gibbons | Feb. 11, 1890 |
| 766,427 | Crowell | Aug. 2, 1904 |
| 781,709 | Benson | Feb. 7, 1905 |
| 1,022,882 | Schwenn | Apr. 9, 1912 |
| 1,220,495 | Cadby | Mar. 27, 1917 |
| 1,265,338 | Jenks | May 7, 1918 |
| 1,272,996 | Poschadel | July 16, 1918 |
| 1,357,940 | Berry | Nov. 9, 1920 |
| 1,488,462 | Abram | Apr. 1, 1924 |
| 1,614,338 | Awoki | Jan. 11, 1927 |
| 1,666,389 | Mander | Apr. 17, 1928 |
| 1,862,533 | Fish, Jr. | June 14, 1932 |
| 2,042,801 | Pittman | June 2, 1936 |
| 2,059,769 | Bell | Nov. 3, 1936 |
| 2,103,496 | Saunders | Dec. 28, 1937 |
| 2,239,093 | Giller | Apr. 22, 1941 |
| 2,256,922 | Bottome | Sept. 23, 1941 |
| 2,549,440 | Erro | Apr. 17, 1951 |

FOREIGN PATENTS

| Number | Country | Date |
|---|---|---|
| 177 | Great Britain | Jan. 3, 1896 |
| 4,874 | Great Britain | Mar. 12, 1892 |
| 6,477 | Great Britain | Mar. 15, 1910 |
| 13,956 | Great Britain | Aug. 18, 1891 |
| 18,393 | Great Britain | Sept. 12, 1899 |
| 496,016 | Great Britain | Nov. 23, 1938 |